US011972368B2

United States Patent
Lu et al.

(10) Patent No.: US 11,972,368 B2
(45) Date of Patent: Apr. 30, 2024

(54) DETERMINING SOURCE OF INTERFACE INTERACTIONS

(71) Applicant: International Business Machines Corporation, Armonk, NY (US)

(72) Inventors: Liang LL Lu, Beijing (CN); Sun Chun Hua, Beijing (CN); Jian Ling Shi, Baoji (CN); Yi Yang Ren, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 16/576,921

(22) Filed: Sep. 20, 2019

(65) Prior Publication Data
US 2021/0089949 A1     Mar. 25, 2021

(51) Int. Cl.
*G06N 7/00* (2023.01)
*G06F 9/451* (2018.01)
*G06F 21/31* (2013.01)
*G06N 20/00* (2019.01)

(52) U.S. Cl.
CPC ............... *G06N 7/00* (2013.01); *G06F 9/451* (2018.02); *G06F 21/31* (2013.01); *G06N 20/00* (2019.01); *G06F 2221/2133* (2013.01)

(58) Field of Classification Search
CPC .......... G06N 7/00; G06N 20/00; G06F 9/451; G06F 21/31; G06F 2221/2133
See application file for complete search history.

(56) References Cited

U.S. PATENT DOCUMENTS

| 7,895,653 | B2 | 2/2011 | Calo et al. | |
| 8,311,876 | B2 | 11/2012 | House | |
| 9,906,544 | B1 | 2/2018 | Kurupati | |
| 2005/0091184 | A1* | 4/2005 | Seshadri | G06Q 10/107 |
| 2013/0096898 | A1* | 4/2013 | Usadi | G06N 20/00 |
| | | | | 703/10 |
| 2016/0092793 | A1* | 3/2016 | Garrow | G16H 70/40 |
| | | | | 706/12 |
| 2016/0320081 | A1* | 11/2016 | Nikovski | G06F 16/2228 |
| 2017/0185758 | A1 | 6/2017 | Oliker et al. | |
| 2017/0235848 | A1* | 8/2017 | Van Dusen | G06Q 10/101 |
| | | | | 705/12 |

(Continued)

OTHER PUBLICATIONS

Park et al., "Securing Web Service by Automatic Robot Detection", USENIX, 2006, 9 pages. https://www.usenix.org/legacy/event/usenix06/tech/full_papers/park/par . . . .

(Continued)

*Primary Examiner* — Nicholas Augustine
(74) *Attorney, Agent, or Firm* — Scott S. Dobson

(57) ABSTRACT

Methods, systems, computer program products for determining the source of activity during interaction with a user interface are provided. The method comprises selecting one or more input devices from a plurality of available input devices coupled to the user interface and receiving respective measurements for the selected one or more input devices. Based on the received respective measurements, respective feature vectors for the one or more input devices are generated and then inputted to a pre-defined regression model. Then, the source of activity is determined based on a result received from the regression model.

20 Claims, 5 Drawing Sheets

(56) References Cited

U.S. PATENT DOCUMENTS

| | | | | |
|---|---|---|---|---|
| 2017/0300933 | A1* | 10/2017 | Mascaro | G06N 7/01 |
| 2018/0028079 | A1* | 2/2018 | Gurevich | A61B 5/7232 |
| 2018/0032938 | A1* | 2/2018 | Scriffignano | G06Q 10/0635 |
| 2018/0159879 | A1* | 6/2018 | Mestha | G06N 3/084 |
| 2018/0247020 | A1* | 8/2018 | Itu | G16H 10/60 |
| 2018/0276861 | A1* | 9/2018 | Wright | G06F 16/27 |
| 2018/0336481 | A1* | 11/2018 | Guttmann | G06N 5/022 |
| 2019/0156216 | A1* | 5/2019 | Gupta | G06N 3/126 |
| 2019/0159716 | A1* | 5/2019 | Alailima | G09B 5/00 |
| 2019/0172564 | A1* | 6/2019 | Chandra | G06N 20/00 |
| 2019/0228362 | A1* | 7/2019 | Anagnostou | G06Q 10/0635 |
| 2019/0294990 | A1* | 9/2019 | Lopez De Prado | G06N 20/00 |
| 2020/0104401 | A1* | 4/2020 | Burnett | G06F 16/287 |
| 2021/0089949 | A1* | 3/2021 | Lu | G06N 7/00 |

OTHER PUBLICATIONS

"Bot or Human? A Behavior-Based Online Bot Detection System", From Database to Cyber Security, Nov. 2018, 6 pages. https://rd.springer.com/chapter/10.1007/978-3-030-04834-1_21.

Winslow, "Bot Detection via Mouse Mapping", Stanford University, 2009, 4 pages.

Al-Hammadi et al., "Detecting Bots Based on Keylogging Activities", Computer Science and Information Technology, The University of Nottingham, 7 pages, 2010.

* cited by examiner

DETERMINING SOURCE OF INTERFACE INTERACTIONS

BACKGROUND

The present application relates to computing, and more specifically, to methods, systems and computer program products for determining the source of activity during interaction with a user interface.

Web robots, also known as Web Wanderers, Crawlers, or Spiders, are programs that travers the web automatically. Search engines such as Google® use web robots to index the web content, while spammers use them (known as spam bots) to send spam messages, post spam in various places where users interact online (such as social media platforms), or scan for email address, etc. As spam bots collect and spread information maliciously and waste lots of computing resources of information providers, it is desired to prevent them from accessing web contents.

SUMMARY

According to embodiments of the present disclosure, there is provided a method for determining the source of activity during interaction with a user interface. The method comprises selecting one or more input devices from a plurality of available input devices coupled to the user interface and receiving respective measurements for the selected one or more input devices. Based on the received respective measurements, respective feature vectors for the one or more input devices are generated and then inputted to a pre-defined regression model. Then, the source of activity is determined based on a result received from the regression model.

Computer program products and computer systems for determining the source of activity during interaction with a user interface are also provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
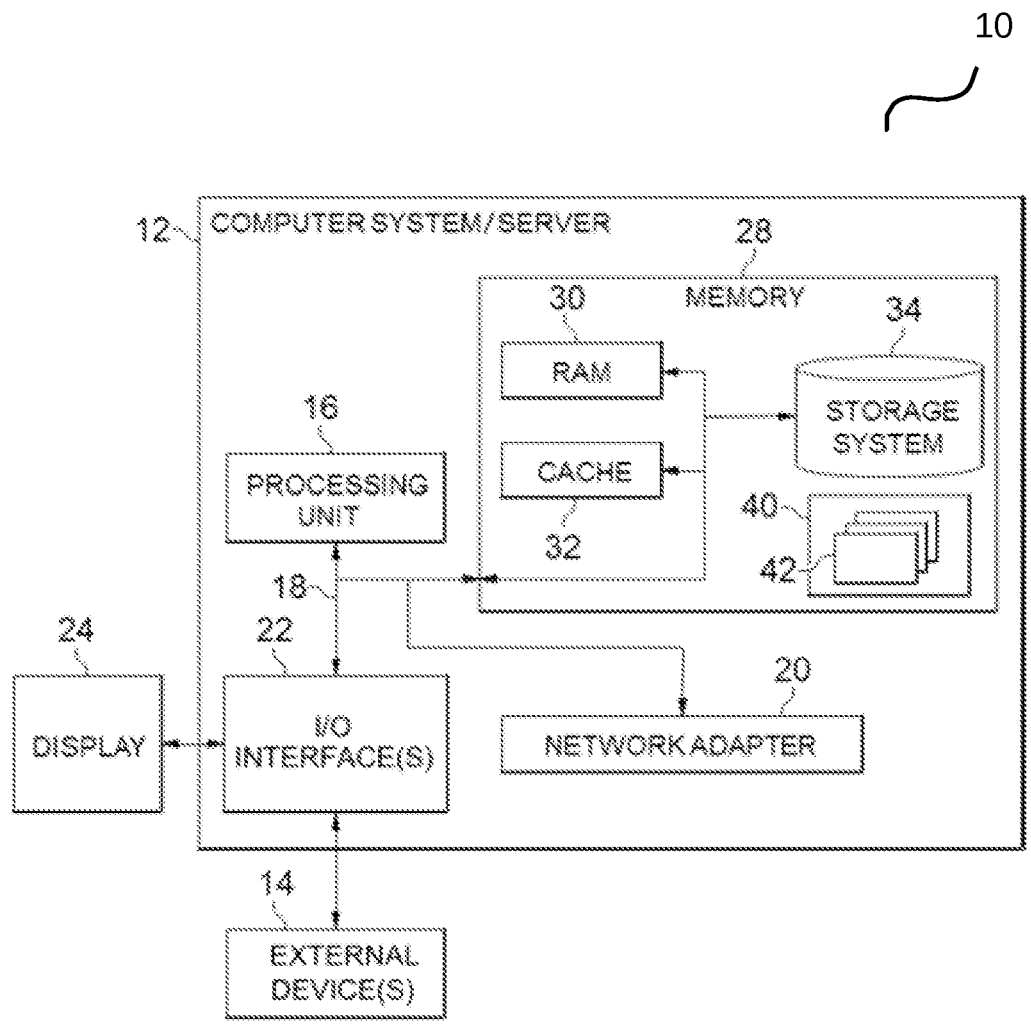
FIG. 1 depicts a cloud computing node according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the disclosure are targeting the problems stated out above and can be deployed on cloud computer systems which will be described in the following. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
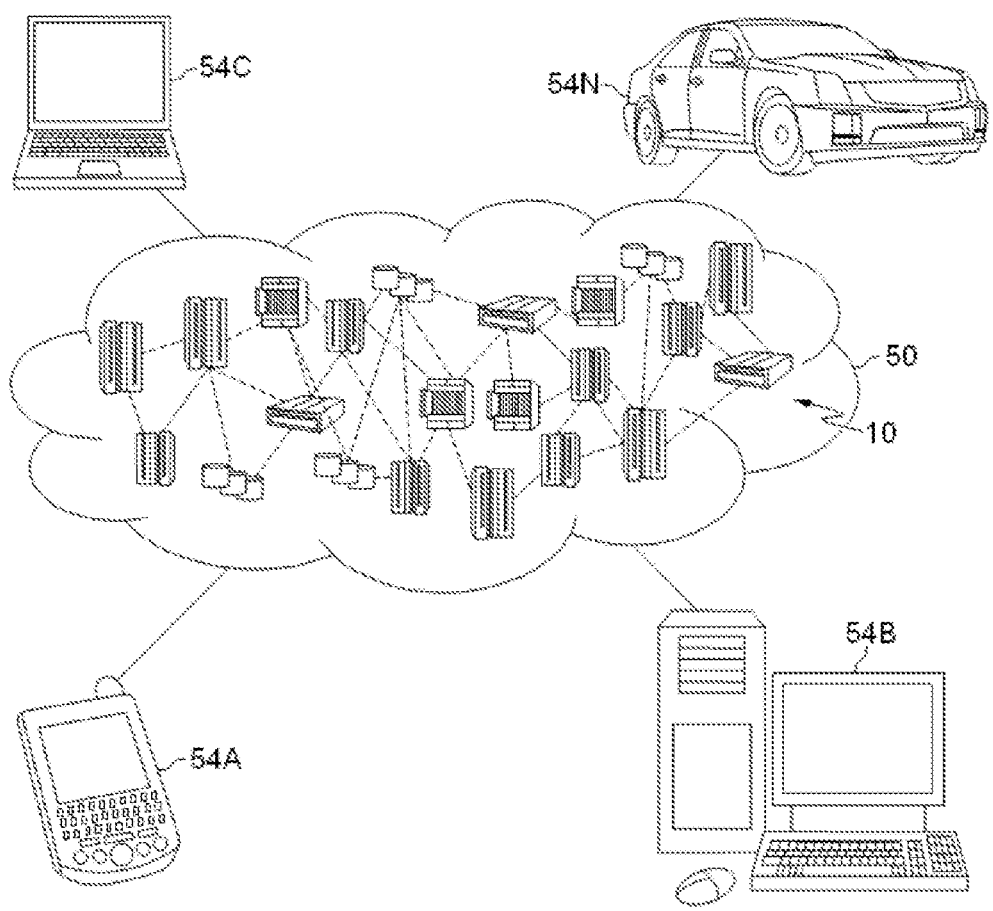
FIG. 2 depicts a cloud computing environment according to embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
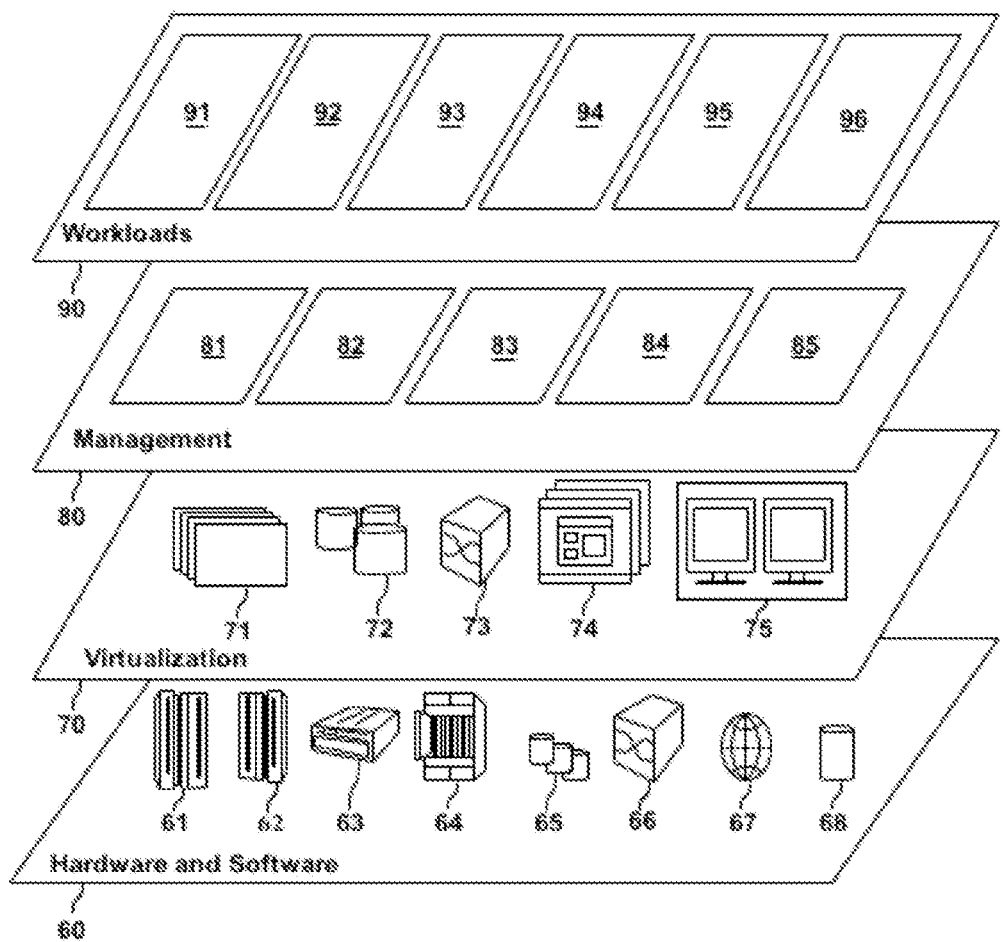
FIG. 3 depicts abstraction model layers according to embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic determination of source of activity 96 according to embodiments of the disclosure.

As described above, it is desired to prevent malicious spam bots from accessing web contents. There are plenty of existing approaches targeting the problem, for example, CAPTCHA (Completely Automated Public Turing test to tell Computers and Humans Apart) is a type of challenge-response test used in computing to determine whether or not the user is human. However, existing approaches need human intervention. Different from existing approaches, embodiments of the present disclosure provide automated approaches to prevent malicious spam bots, which will be described in the following with references to the accompanying FIGS. 4 to 5.

Figure 4:
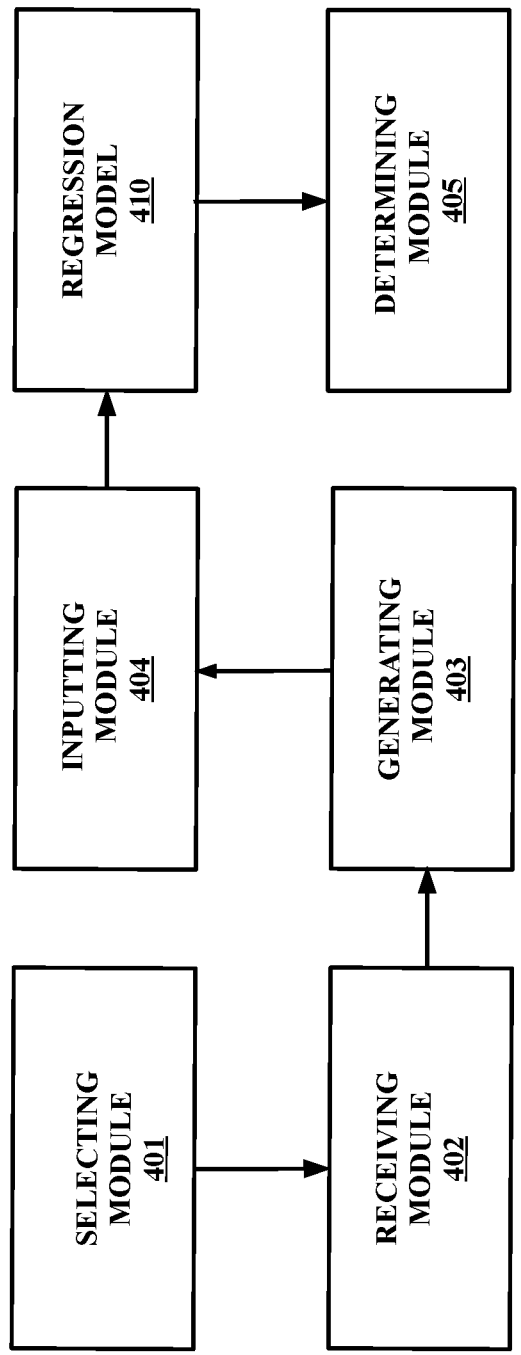
FIG. 4 depicts a block diagram of an example system for determining the source of activity during interaction with a user interface according to an embodiment of the present disclosure.

Referring now to FIG. 4, a block diagram of an example system 400 for determining the source of activity during interaction with a user interface is depicted according to embodiments of the present disclosure. The example system 400 comprises components including a selecting module 401, a receiving module 402, a generating module 403, an inputting module 404, a regression model 410 and a determining module 405.

According to embodiments of the disclosure, a 'user interface' refers to any type of interface with which a person controls a software application used to access web contents. A user interface functions as a medium between a human being and the software application. For example, when the software is a web browser, it may include a graphical user interface (GUI) that is comprised of graphical controls which the user can operate using a mouse, a keyboard, touchscreen, or any other type of input device. For example, a GUI may include a menu bar, drop-down menu, button, text box, and other controls of the web browser, and/or a web page rendered by the web browser.

The selecting module 401 of the system 400 is configured to select one or more input devices from a plurality of available input devices coupled to a user interface. The plurality of available input devices may comprise any type of input devices including but not limited to, for example, keypad, keyboard, mouse, touchpad, touch screen, camera, microphone, and motion sensor, etc. The plurality of available devices may be recorded in an available input device list, which is stored in a location coupled to the selecting module 401. The available input device list may be created during the initialization of a system coupled to the user interface, and stored and maintained in the location mentioned above. The system coupled to the user interface may be a system in which the user interface resides, for example, a computing system that a web browser resides in. The system 400 may reside in the system coupled to the user interface, or may be coupled to it. The system 400 may retrieve the available input device list from the location and select the one or more input devices from the available input device list. The selection of the one or more input devices may be recorded by the system 400 in a selected input device list for future reference.

The receiving module 402 of the system 400 is configured to receive respective measurements for the selected one or more input devices. According to embodiments of the disclosure, for a selected input device, the corresponding measurements include respective measurements of one or more activities on the user interface interacted via the select input device. Respective measurements of the one or more activities on the user interface interacted via an input device may be pre-defined in a configuration file stored in the system 400. For example, in the case that the selected device is keyboard, it is pre-defined in the configuration file that for keyboard, respective measurements of the one or more activities on the user interface interacted via an input device include an input speed (e.g., how many keys/words inputted per minute), a time interval between keystrokes (e.g., for two letters in different rows in same hand stroking), and a time interval for a typing error. It should be pointed out that the above examples are merely for the purpose of illustration, there might be fewer or more types of measurements pre-defined in the configuration file. The respective measurements of the one or more activities on the user interface interacted via the selected input device may be received from one or more measuring components (not shown) that are coupled to the selected one or more input devices. The one or more measuring components may reside in the system coupled to the user interface, or may be coupled to it. The one or more measuring components may be implemented using any appropriate techniques existing nowadays or developed in the future. For example, for keyboard, a keystroke logger (either software-based or hardware-based) may be implemented.

The generating module 403 of the system 400 is configured to generate respective feature vectors for the selected one or more input devices. According to an embodiment of the disclosure, a feature vector for a selected input device is generated with a type of the selected input device, a weight of the selected input device, the weighted average probability calculated for the selected input device, and a corresponding threshold for the selected input device. A feature vector may for example be in the following format:

{device, weight, probability, threshold}

In the example feature vector above, the element 'device' is the type of the selected input device the feature vector represents. The element 'device' in a feature vector is a unique value assigned to each type of input devices. For example, the integer 1 is assigned for keyboard, and the integer 2 is assigned for mouse, etc. The element 'weight' in the feature vector is an assigned weight for the selected input device, which is a value pre-determined based on statistics or experiences. The element 'weight' may be any appropriate formats. The element 'probability' in the feature vector is a probability evaluated based on the received measurements for the selected input device. According to an embodiment of the disclosure, the element 'probability' is a weighted average probability for the selected input device calculated with received respective measurements of one or more activities on the user interface interacted via the selected input device based on respective weights and Gauss distributions of the one or more activities. The element 'threshold' in the feature vector is a threshold value of a probability that if an evaluated probability for the selected input device is above the value, it can be determined that the source of activity is actually from a human being. The element 'probability' and the element 'threshold' are typically in the format of a number between 0 to 1. Each of the values in the feature vector may be normalized.

The inputting module 404 of the system 400 is configured to input the generated respective feature vectors to a pre-defined regression model 410, which is also shown in the system 400. The determining module 405 of the system 400 is configured to determine the source of activity based on a result received from the regression model, which outputs the result based on the generated respective feature vectors inputted.

According to an embodiment of the disclosure, the pre-defined regression model 410 is a logistic regression model. Suppose the hypothesis function of the logic regression model is shown in the following $$h_\theta(x) = g(\theta^T x), g(z) = \frac{1}{1 + e^{-z}}$$

wherein, g (z) is a Sigmoid function, also known as a logistic function. The Sigmoid function is an S-shaped curve with its value between [0, 1]. The value of the function will be close to 0 or 1 when it is far away from 0.

Therefore, the logistic regression model is shown in the following $$h_\theta(x) = \frac{1}{1 + e^{-\theta^T x}}$$

wherein x is the input, θ is the parameter we need to determine.

The hypothesis function of the logistic regression model is shown in the following $$P(y = 1 \mid x; \theta) = g(\theta^T x) = \frac{1}{1 + e^{-\theta^T x}}$$

the meaning of this function is the probability of y=1 for the given x and θ. Here, g(h) is the Sigmoid function described above, the corresponding decision function is $$y^* = 1, \text{if } P(y=1|x) > th$$

It is a general practice to choose 0.5 as the threshold th, however, if the accuracy of the positive example is high, a larger threshold may be chosen, while a smaller threshold may be chosen if the recall is high. As stated above, existing approaches need human intervention and the purpose of the disclosure is to minimize human intervention, according to embodiments of the disclosure, a larger threshold is chosen, which means only when the input x leads to a result above the threshold th, it will be determined that the source activity interacted with the user interface is from human being. According to embodiments of the disclosure, the threshold th may be pre-defined based on statistics or experiences.

For a given training sample (x,y), the model h, and the parameter θ, h(θ)=θ$^T$x (θ$^T$ means transpose of θ) A cost function C(θ) measures the difference between the value h(θ) predicted by the model and real value y. An example of C(θ) used in logistic regression is cross entropy. Where there are multiple training samples, an average value of all the cost functions may be recorded as J(θ). When the model h has been determined, the parameter θ needs to be trained. The training process is the process of changing θ to get the minimum of J(θ), i.e., $$\min_{\theta} J(\theta)$$

Training samples, according to embodiments of the disclosure, are in the format as described above, i.e., {device, weight, probability, threshold}. According to embodiments of the disclosure, the training process mentioned above may be performed by a neural network. The training process of the regression model may be performed in advance using real-life training data. After the training process has been completed, the regression model is determined.

Upon receiving from the inputting module 404 of the system the generated respective feature vectors, the regression model 410 may output a result (0 or 1) to indicate whether the source of activity interacted with the user interface is from a human being. According to an embodiment of the disclosure, the generated respective feature vectors for the selected one or more input devices are inputted to the regression model until the source of activity is determined, i.e., from human or from bots, or all the respective feature vectors have been inputted. With the output of the regression model 410, the determining module 405 of the system may determine the source of activity interacted with the user interface is from human being if the output is 1, or is not from human being if the output is 0. It should be pointed out that the meaning of the output may be vice versa depending on the actual implementation.

Figure 5:
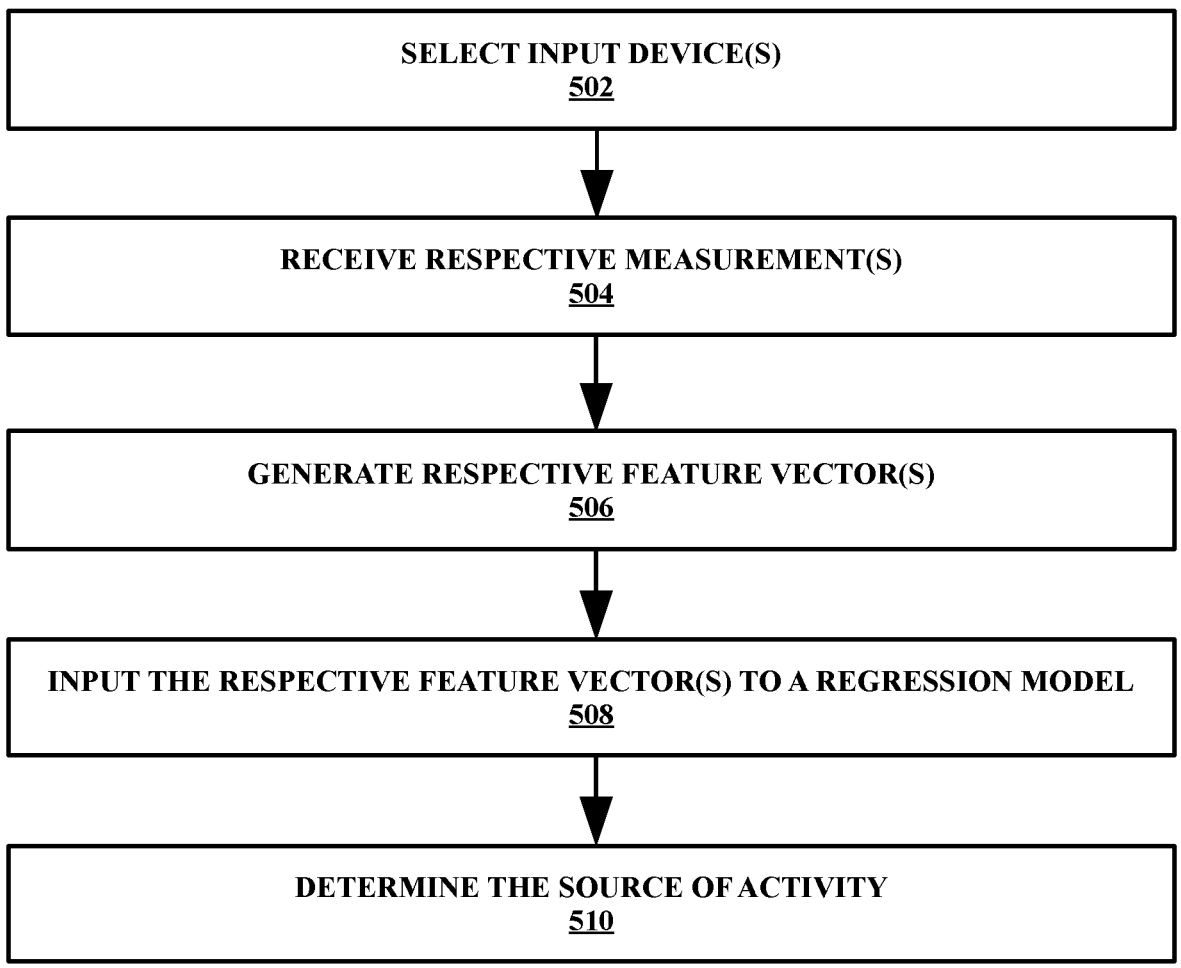
FIG. 5 depicts a flowchart of an example method for determining the source of activity during interaction with a user interface according to an embodiment of the present invention.

Referring now to FIG. 5, a flowchart of an example method 500 for determining the source of activity during interaction with a user interface according to an embodiment of the present disclosure is depicted.

At step 502, one or more input devices from a plurality of available input devices coupled to a user interface are selected, for example, by the selecting module 401 of the system 400 in FIG. 4.

At step 504, respective measurements for the selected one or more input devices are received, for example, by the receiving module 402 of the system 400 in FIG. 4.

At step 506, respective feature vectors for the selected one or more input devices are generated, for example, by the generating module 403 of the system 400 in FIG. 4.

At step 508, the respective feature vectors generated are inputted, to a pre-defined regression model, for example, by the inputting module 404 of the system 400 in FIG. 4.

At step 510, the source of activity is determined based on a result received from the regression model, for example, by the determining module 405 of the system 400 in FIG. 4.

According to an embodiment of the disclosure, for a selected input device, respective measurements of one or more activities on the user interface interacted via the selected input device are received. According to an embodiment of the disclosure, a weighted average probability for the selected input device is calculated with the received respective measurements of the one or more activities based on respective weights and Gauss distributions of the one or more activities. According to an embodiment of the disclosure, a feature vector for the selected input device is generated with a type of the selected input device, a weight of the selected input device, the weighted average probability calculated for the selected input device, and a corresponding threshold for the selected input device. According to an embodiment of the disclosure, the respective feature vectors for the one or more input devices are inputted to the regression model until the source of activity is determined, i.e., from human or from bots, or all the respective feature vectors have been inputted. According to an embodiment of the disclosure, the pre-defined regression model is a logistic regression model. According to an embodiment of the disclosure, the pre-defined regression model is trained with a neural network.

It should be noted that the content rendering according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a source of activity for an interaction with a user interface, comprising:
    selecting one or more input devices from a plurality of available input devices coupled to the user interface and configured to interact with graphical controls of the user interface;
    receiving respective measurements for the selected one or more input devices during an interaction with the graphical controls of the user interface via the selected one or more input devices; and
    determining whether the source of activity of the interaction with the user interface is from a human being based on a result received from a pre-defined regression model with one or more feature vectors generated based on the received respective measurements as its input.

2. The computer-implemented method of claim 1, wherein a feature vector for the selected input device is generated with
    a type of the selected input device,
    a weight of the selected input device,
    a weighted average probability calculated for the selected input device, and
    a corresponding threshold for the selected input device.

3. The computer-implemented method of claim 2, wherein the weighted average probability for the selected input device is calculated with the respective measurements of the one or more activities and based on respective weights and Gauss distributions of the one or more activities.

4. The computer-implemented method of claim 1, wherein the respective feature vectors for the one or more input devices are inputted to the regression model until the source of activity is determined, or all the respective feature vectors have been inputted.

5. The computer-implemented method of claim 1, wherein the pre-defined regression model is a logistic regression model.

6. The computer-implemented method of claim 1, wherein the pre-defined regression model is trained with a neural network.

7. A computer program product for determining a source of activity for an interaction with a user interface, the computer program product comprising a computer readable storage medium having program code embodied therewith, the program code executable by one or more processors to cause the one or more processors to perform a method comprising:
selecting one or more input devices from a plurality of available input devices coupled to the user interface and configured to interact with graphical controls of the user interface;
receiving respective measurements for the selected one or more input devices during an interaction with the graphical controls of the user interface via the selected one or more input devices; and
determining whether the source of activity of the interaction with the user interface is from a human being based on a result received from a pre-defined regression model with one or more feature vectors generated based on the received respective measurements as its input.

8. The computer program product of claim 7, wherein a feature vector for the selected input device is generated with
a type of the selected input device,
a weight of the selected input device,
a weighted average probability calculated for the selected input device, and
a corresponding threshold for the selected input device.

9. The computer program product of claim 8, wherein the weighted average probability for the selected input device is calculated with the respective measurements of the one or more activities and based on respective weights and Gauss distributions of the one or more activities.

10. The computer program product of claim 7, wherein the respective feature vectors for the one or more input devices are inputted to the regression model until the source of activity is determined, or all the respective feature vectors have been inputted.

11. The computer program product of claim 7, wherein the pre-defined regression model is a logistic regression model.

12. The computer program product of claim 7, wherein the pre-defined regression model is trained with a neural network.

13. A system for determining a source of activity for an interaction with a user interface, the system comprising one or more processors, one or more computer readable storage mediums, and program instructions stored on at least one of the one or more storage mediums for execution by at least one of the one or more processors via at least one of the one or more memories to perform a method comprising:
selecting one or more input devices from a plurality of available input devices coupled to the user interface and configured to interact with graphical controls of the user interface;
receiving respective measurements for the selected one or more input devices during an interaction with the graphical controls of the user interface via the selected one or more input devices; and
determining whether the source of activity of the interaction with the user interface is from a human being based on a result received from a pre-defined regression model with one or more feature vectors generated based on the received respective measurements as its input.

14. The system of claim 13, wherein a feature vector for the selected input device is generated with
a type of the selected input device,
a weight of the selected input device,
a weighted average probability calculated for the selected input device, and
a corresponding threshold for the selected input device.

15. The system of claim 14, wherein the weighted average probability for the selected input device is calculated with the respective measurements of the one or more activities and based on respective weights and Gauss distributions of the one or more activities.

16. The system of claim 13, wherein the respective feature vectors for the one or more input devices are inputted to the regression model until that the source of activity is determined, or all the respective feature vectors have been inputted.

17. The system of claim 13, wherein the pre-defined regression model is a logistic regression model.

18. The computer-implemented method of claim 1, wherein the one or more selected input devices are selected from the group consisting of a mouse, a keyboard, and a touchscreen.

19. The computer-implemented method of claim 1, wherein the respective measurements includes a time interval between keystrokes for a keyboard.

20. The computer-implemented method of claim 1, wherein the one or more selected input device includes a keyboard and the respective measurements include measurements from a keystroke logger.

* * * * *